United States Patent [19]

Velazquez

[11] Patent Number: 5,057,829
[45] Date of Patent: Oct. 15, 1991

[54] COMPUTER NETWORKING APPARATUS

[75] Inventor: Juan F. Velazquez, Saline, Mich.

[73] Assignee: Secom Information Products Company, Romulus, Mich.

[21] Appl. No.: 318,123

[22] Filed: Mar. 2, 1989

[51] Int. Cl.⁵ .............................................. G05B 23/02
[52] U.S. Cl. ............................ 340/825.06; 340/310 R; 340/310 A
[58] Field of Search .......................... 375/7, 8; 455/78; 340/825, 825.03, 825.06, 825.5, 825.51, 310 R, 310 A; 370/85.1, 85.6; 332/100; 328/165, 167; 377/50, 56, 114

[56] References Cited

U.S. PATENT DOCUMENTS

| | | | |
|---|---|---|---|
| 4,009,443 | 2/1977 | Coulter et al. ...................... | 377/50 X |
| 4,024,501 | 5/1977 | Herring et al. .......................... | 375/7 |
| 4,173,754 | 11/1979 | Feiker .............................. | 340/310 R |
| 4,368,439 | 1/1983 | Shibuya et al. ....................... | 332/100 |
| 4,425,664 | 1/1984 | Sherman et al. .......................... | 375/8 |
| 4,535,401 | 8/1985 | Penn ........................... | 340/310 R X |
| 4,556,864 | 12/1985 | Roy ............................................. | 375/7 |
| 4,665,519 | 5/1987 | Kirchner et al. ..................... | 375/8 X |
| 4,697,166 | 9/1987 | Warnagiris et al. ................ | 375/7 X |
| 4,794,620 | 12/1988 | Moore et al. ............................ | 375/8 |
| 4,852,122 | 7/1989 | Nelson et al. ............................ | 375/8 |

FOREIGN PATENT DOCUMENTS

| | | | |
|---|---|---|---|
| 0061316 | 9/1982 | European Pat. Off. ................ | 375/8 |
| 0230346 | 12/1984 | Japan ...................... | 375/7 |

Primary Examiner—Ulysses Weldon
Attorney, Agent, or Firm—Dykema Gossett

[57] ABSTRACT

An adjustment free computer networking apparatus is shown which isolates the transmitter portion thereof from the power line when it is not transmitting, has a carrier isolator provided within its power supply to prevent it from shorting out its own signal, and which has a crystal oscillator to maintain the frequency of the signals being used to transmit data.

6 Claims, 12 Drawing Sheets

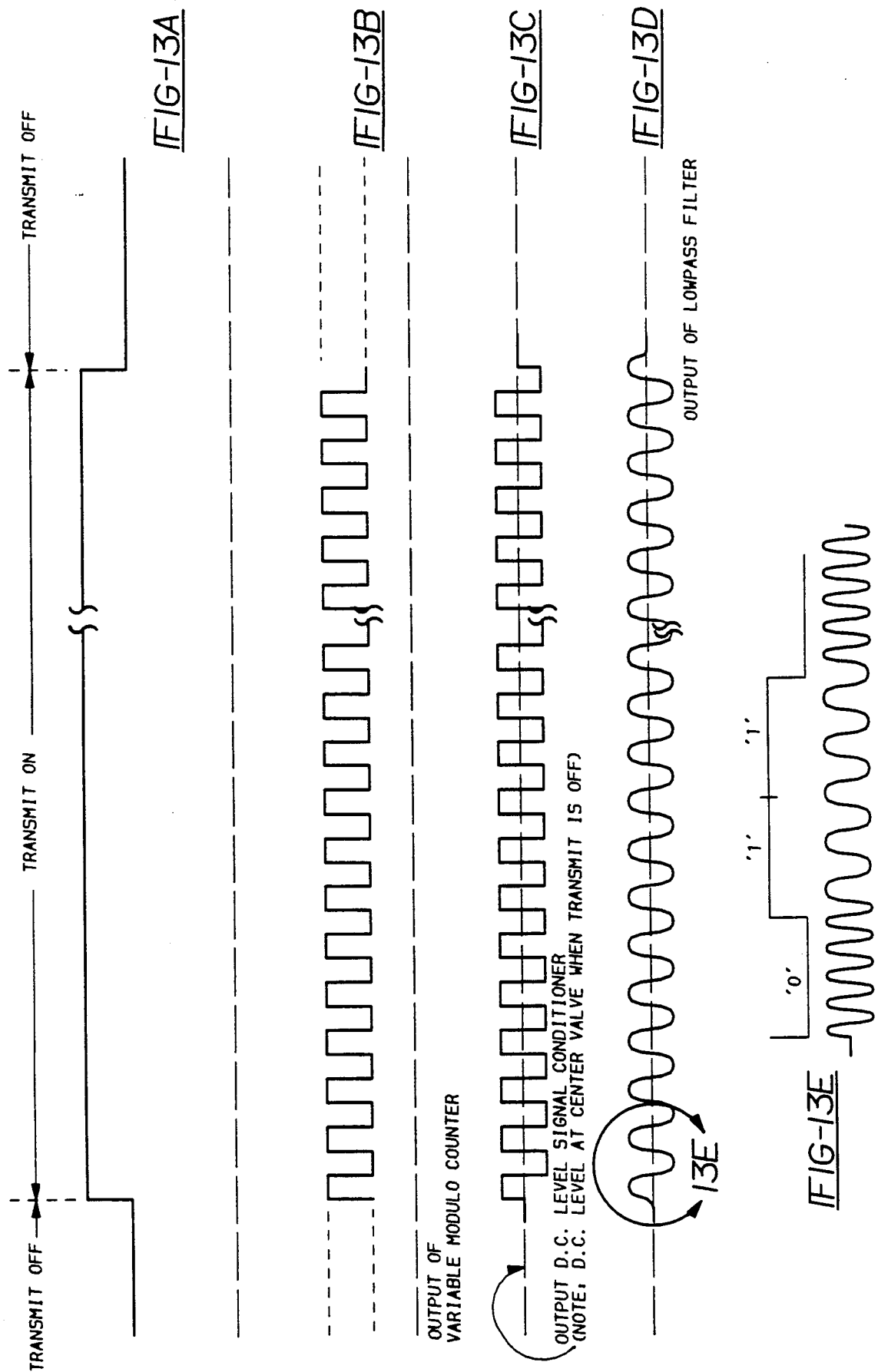

COMPUTER NETWORKING APPARATUS

BACKGROUND OF THE INVENTION

1. Field of Invention

The present invention in its broad sense relates to an apparatus for connecting two devices having information to exchange such as when a computer wishes to exchange information with another computer, a computer wishes to send a control signal to a device under its control, or when a device being monitored wishes to transmit a report to the monitoring device. By way of example, there is shown a computer networking apparatus which may connect any number of computers in the network to each other over a communications link such as the building wiring, telephone lines or an R-F communications link.

2. Description of the Prior Art

A review of the prior art will show that there have been many attempts to develop a means of joining sending and receiving devices together other than by the well-known "hard wired" network. Several of these, like the preferred embodiment of the present invention, involve networking computers together over building wiring or telephone lines. However, up until the present time, none of these devices has been successful. It is believed that those devices which have attempted to network over the power lines have not been successful because they have not been able to maintain a strong enough signal to overcome the noise on the power line and/or the frequency impressed on the power line could not be maintained when more than a few units were placed on the power lines, thus making commercially practical networks impossible.

SUMMARY OF THE INVENTION

In order to solve the frequency and signal strength problems of prior art networking devices, I have provided a networking apparatus which isolates the transmitter portion thereof from the power line when it is not transmitting, has a provision within its power supply to prevent it from shorting out its own signal, which in previous networking devices of which I am aware could attenuate fifty to sixty percent of the signal strength, and which has a crystal oscillator, rather than adjustable frequency source, to maintain the frequency, thus providing an adjustment-free system which allows many computers or other devices to be placed in a network connected by building wiring, telephone lines or an R-F link, and be placed at relatively large distances from each other, if desired, thus making a working network practical.

Thus, it is an object of the present invention to provide for the connecting of a device having information to transmit to a device wanting to receive such information through an apparatus which communicates with such devices over building wiring, telephone lines, an R-F link or other means.

A further object of the present invention is to provide a computer networking apparatus which provides communication between computers over building wiring.

A further object of the present invention is to provide a computer networking apparatus of the type having a crystal oscillator to maintain its frequency, thus providing that when a plurality of such devices are placed in a computer network, an adjustment-free system is provided.

A still further object of the present invention is to provide within the power supply of a computer networking apparatus of the foregoing nature, means to prevent it from shorting out its own signal.

A still further object of the present invention is to provide a computer networking apparatus having a means to isolate the transmitter from the power supply when it is not transmitting.

Further objects and advantages of the present invention will be apparent from the following description and dependent claims, reference being made to the accompanying drawings forming a part of this specification, wherein like reference characters designate corresponding parts in the several views.

BRIEF DESCRIPTION OF THE DRAWINGS

FIG. 13 in its entirety is a timing chart showing the relationship between the transmit signal from the transmit logic of FIG. 11, the output of the variable modulo counter, and the output of the DC Level Signal Conditioner.

FIG. 13A is the representation of the output of the transmit logic,

FIG. 13B is the output of the variable modulo counter, and

FIG. 13C is the output of the DC Level Signal Conditioner, while

FIG. 13D is the output of the low pass filter.

FIG. 13E shows an enlargement of a portion of FIG. 13D showing the frequency shift which occurs in the output of the low pass filter and how that frequency shift represents logic zeros and logic ones.

It is to be understood that the present invention is not limited in its application to the details of construction and arrangement of parts illustrated in the accompanying drawings, since the invention is capable of other embodiments, and of being practiced or carried in various ways within the scope of the claims. Also, it is to be understood that the phraseology and terminology employed herein is for the purpose of description, and not of limitation.

DESCRIPTION OF THE PREFERRED EMBODIMENT

Figure 11:
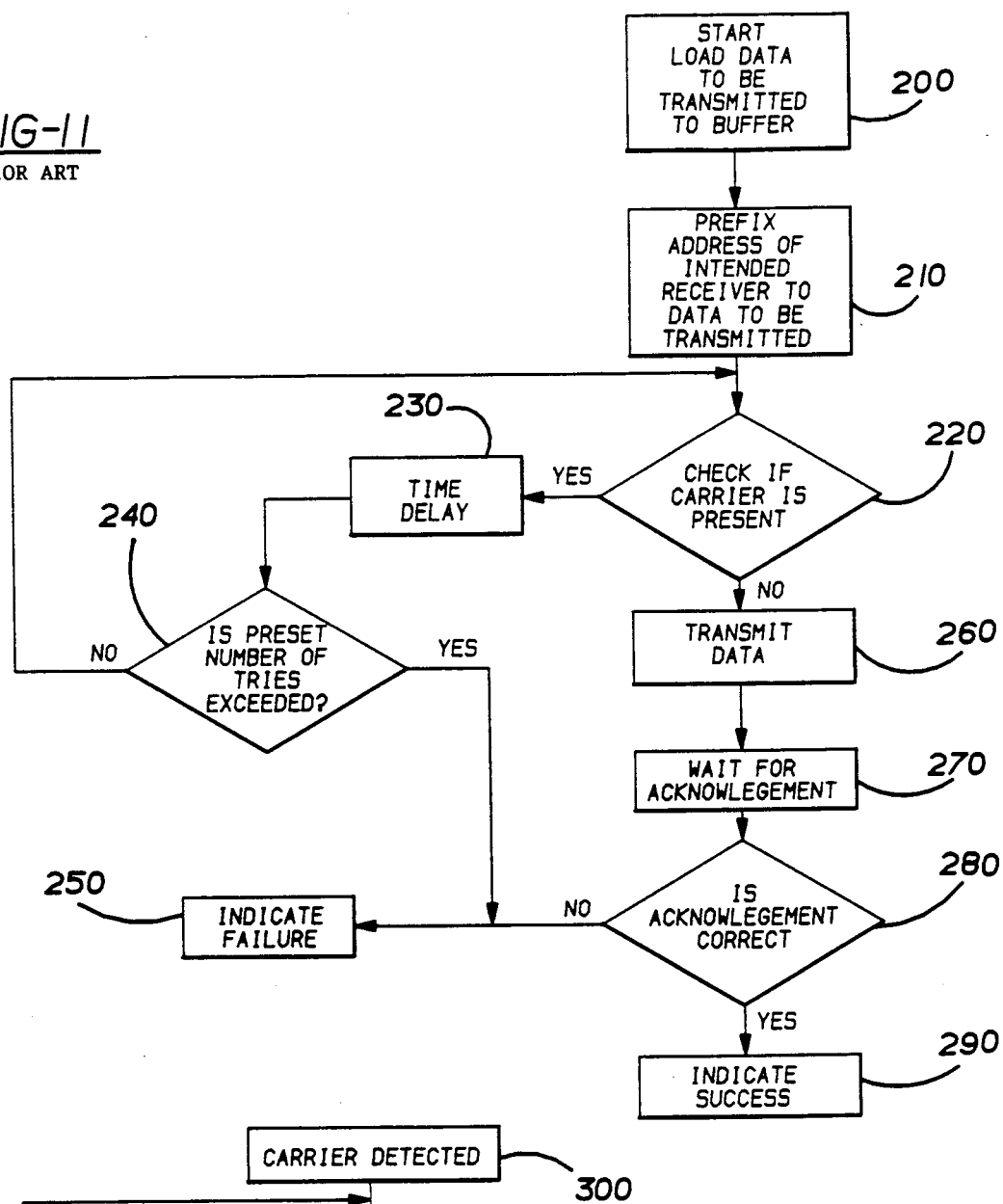
FIG. 11 is a flow chart showing the steps in the operation of the transmit portion of a network embodying my construction.

Referring first to FIG. 11, there is shown a flow chart illustrating the steps which a typical network will go through to transmit data between a device having data to send and a device which is intended to receive said data. This flow chart is generic and would apply to any networking system. For purposes of illustration, a computer network is being used as an example, and the sending computer would have a networking program loaded therein. When the sending computer would have data to send, the data would be loaded into a buffer (Box 200) and the computer would prefix the address of the intended receiver onto to the data to be transmitted (Box 210). The computer would then check if there is a carrier present on the line (Box 220), and if there is a carrier present it means that there is another computer sending information, and the subject sending computer must wait until the line is clear to send its information.

If a carrier is present, the computer would wait for a pre-determined time delay (Box 230), and if a preset number of tries is not exceeded (Box 240), the system would then loop around and go back to decision Box 220 to see if the carrier was still present on the power line. It would repeat this until the preset number of tries would be exceeded, at which time the system would indicate failure (Box 260), or it would find, during one of its tries, that there was no carrier present on the data line. It would then transmit the data (Box 260), wait for acknowledgment that the data has been received (Box 270), and would determine if the acknowledgment was correct (Box 280), and then indicate success at Box 290.

It is only at the step labeled Box 260 of transmitting data, and its companion step of receiving and processing data (Box 340, FIG. 12) that my computer networking apparatus becomes active in providing a link between the sending device and the receiving device.

With the loading of the buffer, the prefixing of the address, and the detecting of the carrier being operations done by the devices to be connected, it is assumed in the present application that each piece of equipment of sending or receiving equipment will have some sort of artificial intelligence to prepare the data for transmission and place it in a temporary memory, such as a buffer, after such data is extracted from the necessary files in the computer. It is recommended that this data be placed in the buffer in groups of from 128 to 156 bytes, although my improved networking apparatus is operable outside these ranges.

Figure 12:
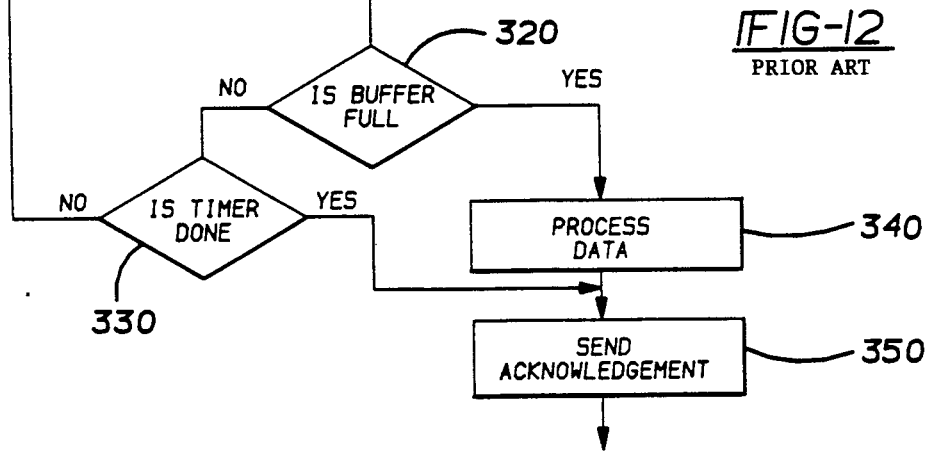
FIG. 12 is a flow chart showing the steps in the operation of the receive portion of a network embodying my construction.

Referring now to FIG. 12, there can be seen a flow chart illustrating the steps a typical network will undertake when a receiving device is waiting to receive data. The receiving device will remain inactive until a carrier is detected box 300. Once the carrier is detected, the network apparatus will begin to receive data and load data to the receive buffer. The question will be asked, "Is the buffer full?" (Box 320), and if the buffer is not full, the system will ask "Is the system timer done?" Box 330. The system will then loop back to Box 310 and continue to receive data until the buffer is full, until which time the networking apparatus will process the data (Box 330) and send an acknowledgment (Box 340).

Figure 1:
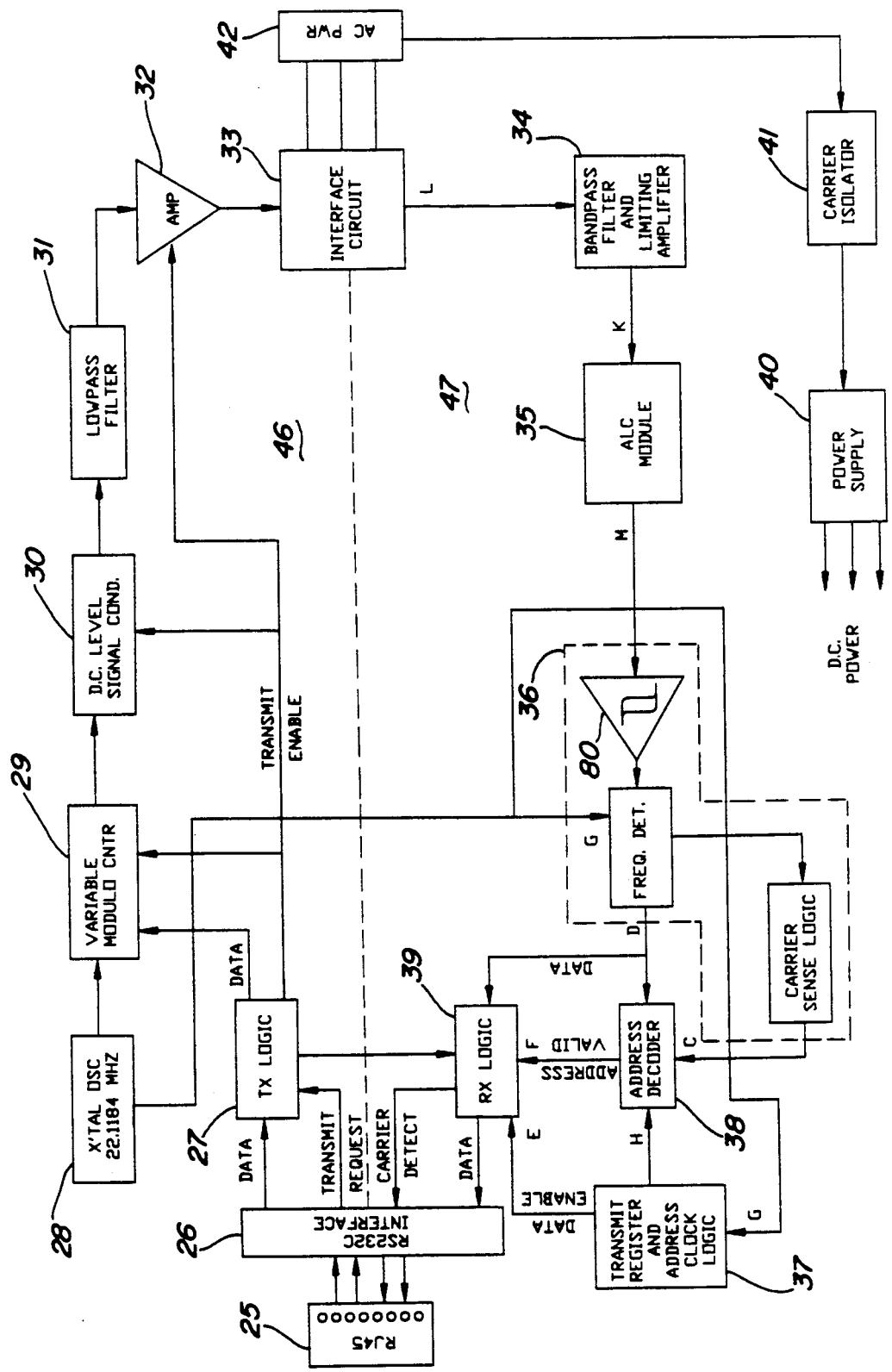
FIG. 1 is a diagrammatic view of a networking apparatus embodying the construction of my invention.

The general operation of my networking apparatus can be seen by referring to the diagrammatic view thereof, shown in FIG. 1, wherein my apparatus can be generally seen to have a transmit section 46 and a receive section 47, divided by the dashed line (---) shown therein, with the RJ 45 interface 25, the RS 232C interface 26, and the interface circuit 33 being common to both sections. The data being received through the connecting means, which in the preferred embodiment is the RJ45 interface 25 will be in the form of a square wave representing logic zero's and logic one's, which in turn are binary representations of the data to be transmitted. This will be accepted by my networking apparatus through information accepting means in the form of an RS232C interface 26, and then be supplied to the transmit logic 27. When my networking apparatus is in its transmit mode, the transmit logic 27 will supply a transmit enable signal to a means to transmit data (transmit amplifier 32) to prepare it for transmitting data to the AC power line 42 through the interface circuit 33. The data itself is transmitted to the variable modulo counter 29, which is receiving a signal from the crystal oscillator 28. The variable modulo counter, through the use of frequency shift keyed circuitry, acts as a conversion means to convert the data into electrical pulses of fixed frequency by dividing the clock signal into a frequency of 230.4 kilohertz representing a low frequency, which will be transmitted over the power line to represent the logic zero, and into a frequency of 276.5 which will be transmitted through the power line to represent a logic one. Thus, the incoming signals from the computer have now been changed into frequencies of 230.4 kilohertz and 276.5 kilohertz by the combination of the crystal oscillator 28 and the variable modulo counter 29. These signals are conditioned in a means to be hereinafter described through the DC level signal conditioner 30 and the low pass filter 31 before being transmitted to the transmitter amplifier 32 and through the interface circuit 33, into the black wire of the AC power line 42.

If my networking apparatus is to be used in its receive mode, a signal is received from a sending computer through the AC power line 42 through the black wire, and is accepted by receiving means (interface circuit 33), which first supplies the signal to the band pass filter and limiting amplifier 34 which will remove all frequencies outside the frequency band of interest, those being the 276.5 and 230.4 kilohertz signals. The signals remaining after passing through the band pass filter and limiting amplifier 34 are supplied to the automatic level control module 35, which is then used to maintain a constant level signal.

In those cases where the transmitting device is located very close to the receiving device, the limiter portion of the band pass filter and limiting amplifier is provided to prevent damage to the rest of the receiving circuitry. The signals are then passed through the frequency detector and carrier sense logic 36 which now allows the networking apparatus to determine whether a high or low frequency is being received from the sending computer. In other words, the frequency detector and carrier sense logic 36 acts to process the signal being received to change it into a series of logic one's or logic zero',s thus duplicating the data being sent by the transmitting computer.

After passing through the carrier frequency detector and carrier sense logic 36, the data is supplied to means to decode (address decoder 38) which takes a look at the first byte of data to see if this is the networking device for which the data is intended. If it is, an address valid signal is sent to the receiver logic 39, which allows the data from the frequency detector and carrier sense logic to pass through the receiver logic 39 and on to the receiving computer through the RS232C interface 26, and the RJ45 interface 25.

An actual embodiment of a construction embodying my invention is shown in FIGS. 2 through 10. As before, my improved networking device is tied into the computer through the RJ45 interface 25 and the RS232C interface. This interface network provides a hardware link to my networking device, enabling it to transmit and receive logic. When my networking device is acting in its transmit mode, a signal received from the RS232C interface 26 will be sent on to transmit logic 27.

Figure 2:
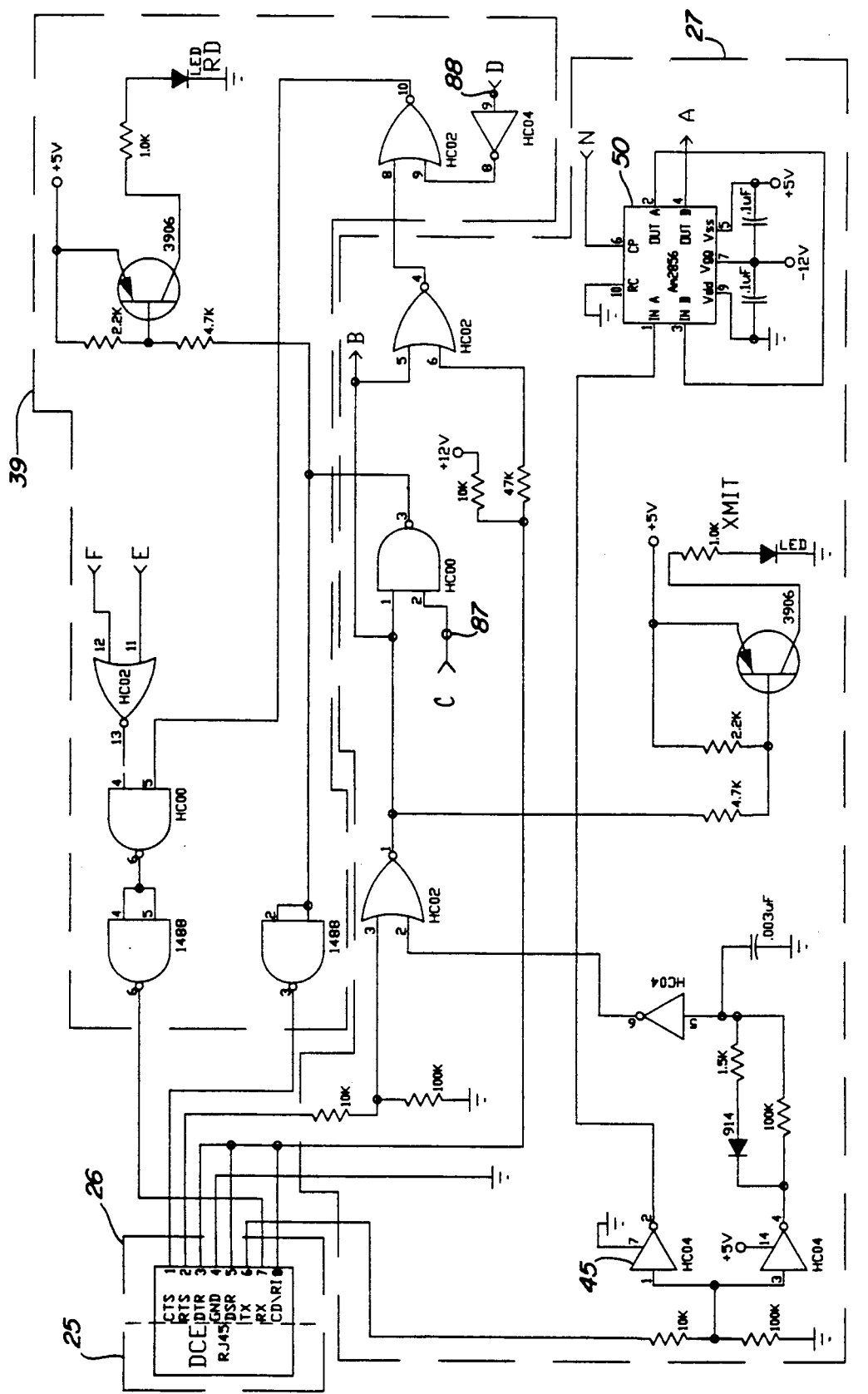
FIG. 2 is a schematic diagram of an actual embodiment of a portion of the construction shown in FIG. 1.

Referring to FIG. 2, the transmit logic performs several functions. Its first function is to allow bits of information to be transmitted. It also provides for the proper time delay of the transmission to allow for the carrier to be present on the line prior to the actual modulation. The serial data to be transmitted coming through amplifier 45 is connected to pin 1 of serial register 50. In the preferred embodiment, serial register 50 is a AM2856 type, which is a very long serial shift register consisting of 2 sections of 256 bits each. In the present invention, the first 256 bits, the output, is fed into the input of the second one of the 256 bits. It can be seen that pin 2 of the serial register 50 is connected to pin 3, which is the input of the second 256 bits, making a 512 bit register.

The time delay, the time it takes for a signal going into pin 1 of the register 50 until the time it comes out on pin 4 is the function of a timing signal applied to pin 6 from transmit register 37. The timing signal was chosen so that t provides a delay of approximately 850 microseconds. This time delay is used later on by the carrier sense logic and frequency detect circuit 36 to qualify the presence or absence of the carrier. For example, if the carrier is detected, but does not persist more than 850 microseconds, then it is not a valid carrier, because any valid carrier would have a persistence in excess of 850 microseconds since the signal was originally delayed 850 microseconds, and the carrier has to be present for 850 microseconds before the signal has been transmitted. This allows my device to discriminate between a burst of noise and a real signal present on the line.

The other function of the transmit logic 27 is to provide a logic level signal that tells the rest of the box that it is in the transmit mode. That signal is called transmit enable, as shown in FIG. 1. The transmit enable signal goes to the variable modulo counter 29, the dc level signal conditioner 30, and to the transmit amplifier 32. In order to permit an adjustment free system, crystal oscillator 28, produces a clock frequency of 22.1184 Megahertz, which provides the basic system clock that is used through out my device.

Figure 3:
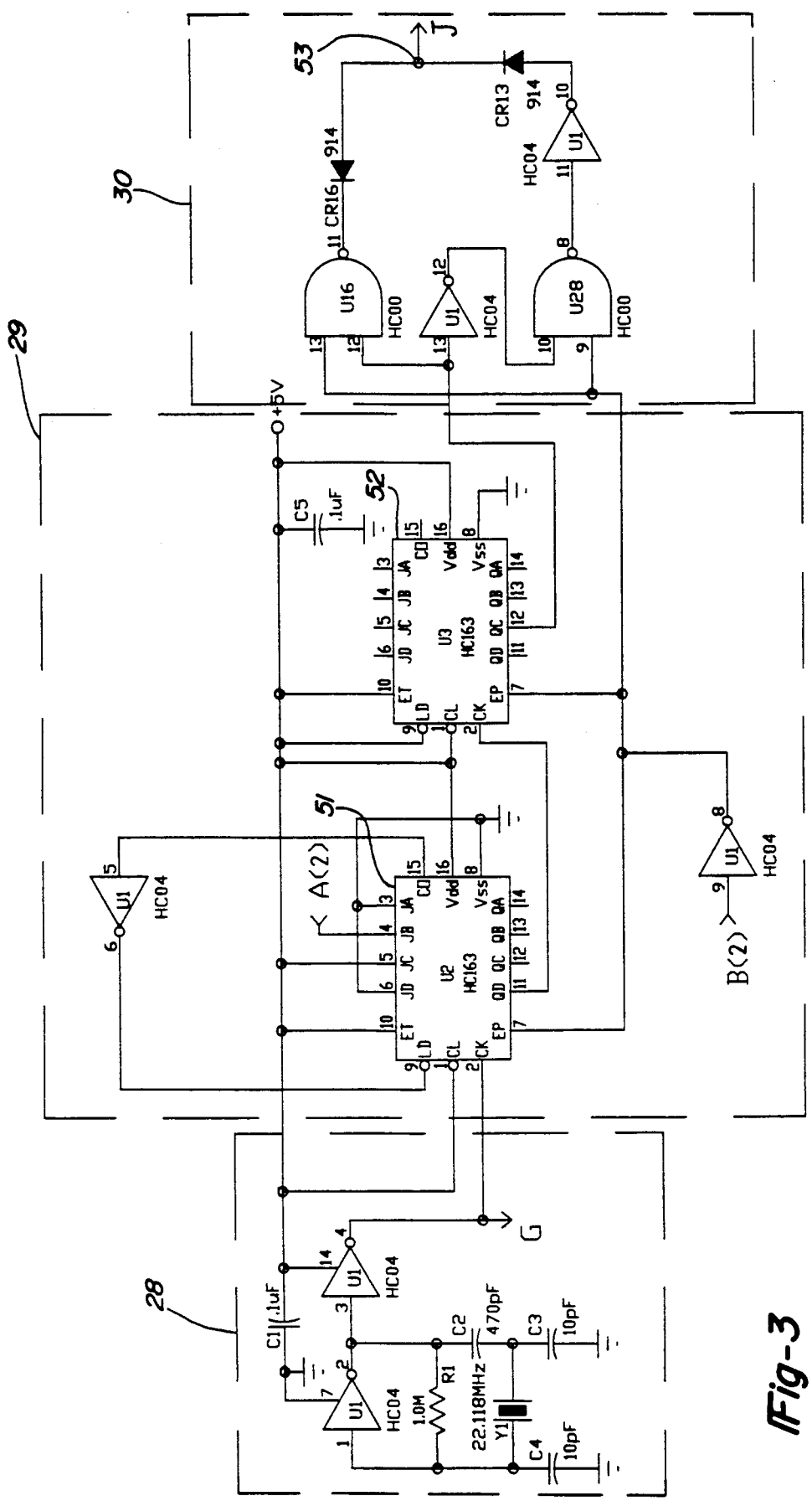
FIG. 3 is a schematic diagram of an actual embodiment of another portion of the construction shown in FIG. 1.

Referring to FIG. 3, the output of crystal oscillator 28 is applied to the variable modulo counter 29, which includes a pair of four bit counters 51 and 52. The count is modulated by the data supplied to pin 4 of the first four bit counter 51. The division frequency is chosen such that with an input clock frequency of 22.1184 megahertz, from crystal oscillator 28 a resulting frequency coming out of the second four bit counter 52 will be 230.4 kilohertz for the low frequency and 276.5 kilohertz on the high frequency.

The low frequency is transmitted to represent logic 1, the high frequency is transmitted to represent logic 0. The signal is next supplied to dc level conditioner 30. The typical wave form coming from pin 12 of second four bit counter 52 is what is known as an NRZ signal shown in FIG. 13B. Since the signal coming from pin 12 has a dc level component to it, it will cause an overloading of the transmit amplifier and transformer. The ideal wave form for transmission is that shown in FIG. 13B. The dc level signal conditioner 30, whose output is shown in FIG. 13C, modifies the wave form when the transmitter is on, such that the output signal has no dc component. The signal coming from connection point 53 of dc level conditioner 30 is next supplied to a low pass filter 31. Keeping in mind that the signals coming from the counter are square waves by their shape, they contain not only the desired frequencies for transmission, but also harmonics of the signal. To minimize transmission of noise, it is desired that all the harmonics be reduced from the signal, as these are not needed for transmission. Low pass filter 31 performs this function, and produces the signal shown in FIG. 13D. The shift in frequency in the output of the low pass filter 58 can be seen by referring to FIG. 13e which shows a portion a FIG. 13d on an enlarged scale. As can be seen, the low frequency represents logic 1s and the high frequency represents logic 0s.

Figure 4:
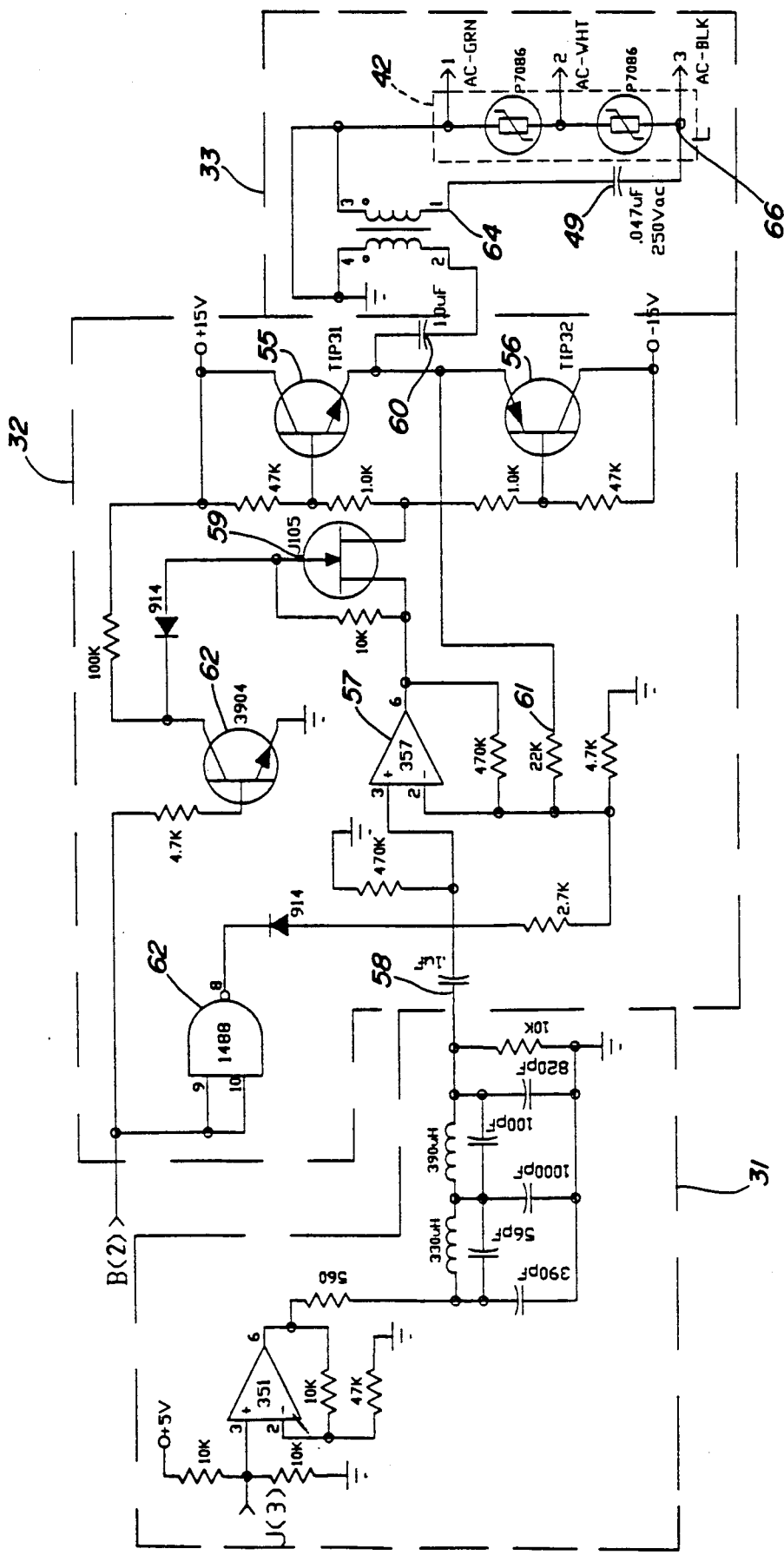
FIG. 4 is a schematic diagram showing an actual embodiment of the transmit amplifier and interface circuit shown in FIG. 1.

Referring to FIG. 4, the low pass filter 31 eliminates all frequencies above about 373.5 kilohertz. The first harmonic that needs to be removed will be the 3rd harmonic, which is around 690 kilohertz. That is the reason for choosing 370.5 kilohertz for the low-pass filter frequency.

After the low pass filter 31, the signal is next supplied to the transmit amplifier 32. The transmit amplifier 32 has 2 inputs. The first input is the signal itself, transmitted from the low pass filter 31, as just described. The second input is the transmit enable signal from the transmit logic circuit 27 previously described. The purpose of the enable signal is to turn on the output stages of the transmit amplifier 32 when it is ready to transmit. The output stages of the amplifier 32 are deliberately turned off, or put into a high impedance state by the transmit enable signal when it is not transmitting, so as not to load down the received signal. If the transmit amplifier 32 were not turned off while not transmitting, it would present a low impedance path to the signal for the received frequencies. This has the effect of short-circuiting the signal, or attenuating the signal it is supposed to be receiving.

The transmit amplifier electronics include a first power transistor 55 and a second power transistor 56 connected in a complimentary symmetry pair. The amplifier is driven through an operational amplifier 57, which provides gain as well as a high input impedance path for the signal transmitted through a 0.1 microfarad capacitor 58. When it is decided to transmit, an electronic switch 59 is enabled (turned on), effectively connecting the output of the amplifier to the junction point 60. Because there is a feed back path from the output of the power transistors 51 and 53 going back through to the operational amplifier 57 through the 22 kilohm resistor 61, this effectively closes the loop and the output maintains a low source impedance.

When the transmit amplifier 32 is turned off or placed in a high impedance state, the electronic switch 59 is turned off by turning on second transistor 62, which effectively puts a negative voltage on the gate of the FET (Field Effect Transistor). The same signal is applied through an inverter 62 which applies a negative voltage to the operational amplifier 51, which sends the output of the amplifier positive. By making the source of the electronic switch 59 positive, and the gate of the switch negative, thus putting it in a cut-off state, this in effect disconnects the operational amplifier 57 from the power transistors 55 and 56. The bias of the power transistors 51 and 52 is chosen so that it will not short circuit the receive signal for up to 6 volts peak to peak receive energy.

The signal coming out of power transistors 55 and 56 is applied to the interface circuit 33 through a 1.0 microfarad capacitor 60. The interface circuit 33 includes an impedance matching transformer 64 which couples the signal through a high voltage capacitor 49 (0.047 microfarad) to the power line 42 (AC black as shown on the interface circuit block 33).

Figure 5:
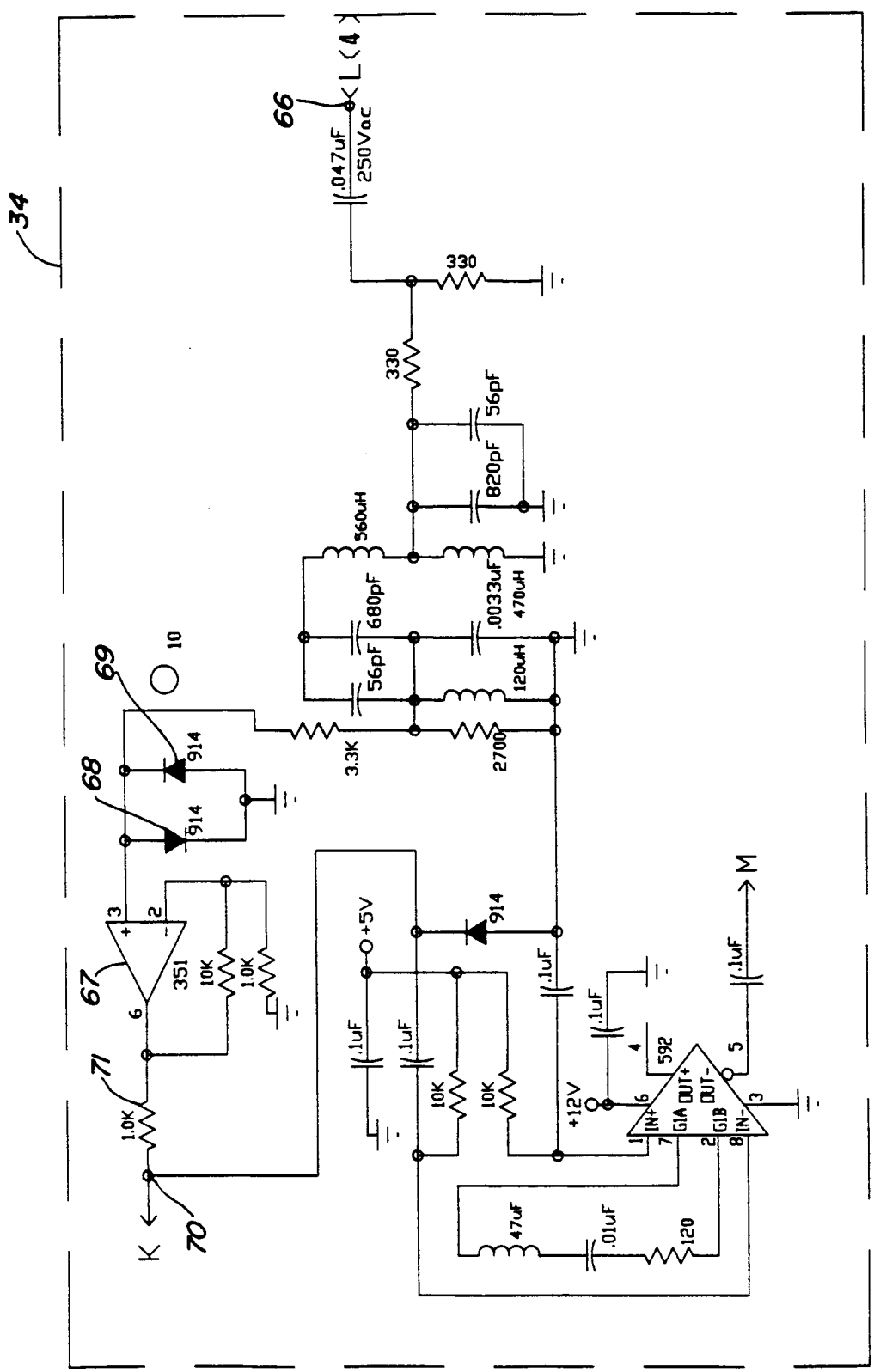
FIG. 5 is a schematic diagram of an actual embodiment of the band pass filter and limiting amplifier shown in FIG. 1.

In its receiving mode, the apparatus receives a signal, through the AC black wire at the second connection point 66. Referring to FIG. 5, the signal is received and is applied to a band pass filter 34. The center frequency of the band pass filter 34 is 248 kilohertz, with a band width of 160 kilohertz +/−3 db points. These frequencies are chosen to minimize the reception of signals outside the frequency of interest. The received signal is passed through a second operational amplifier 67 with a first diode 68 and a second diode 69 as input. The purpose of the diodes is that if the signal exceeds plus or minus one-half volt, it would clip, the incoming signal, and therefore prevent damage to the rest of the circuitry.

Figure 6:
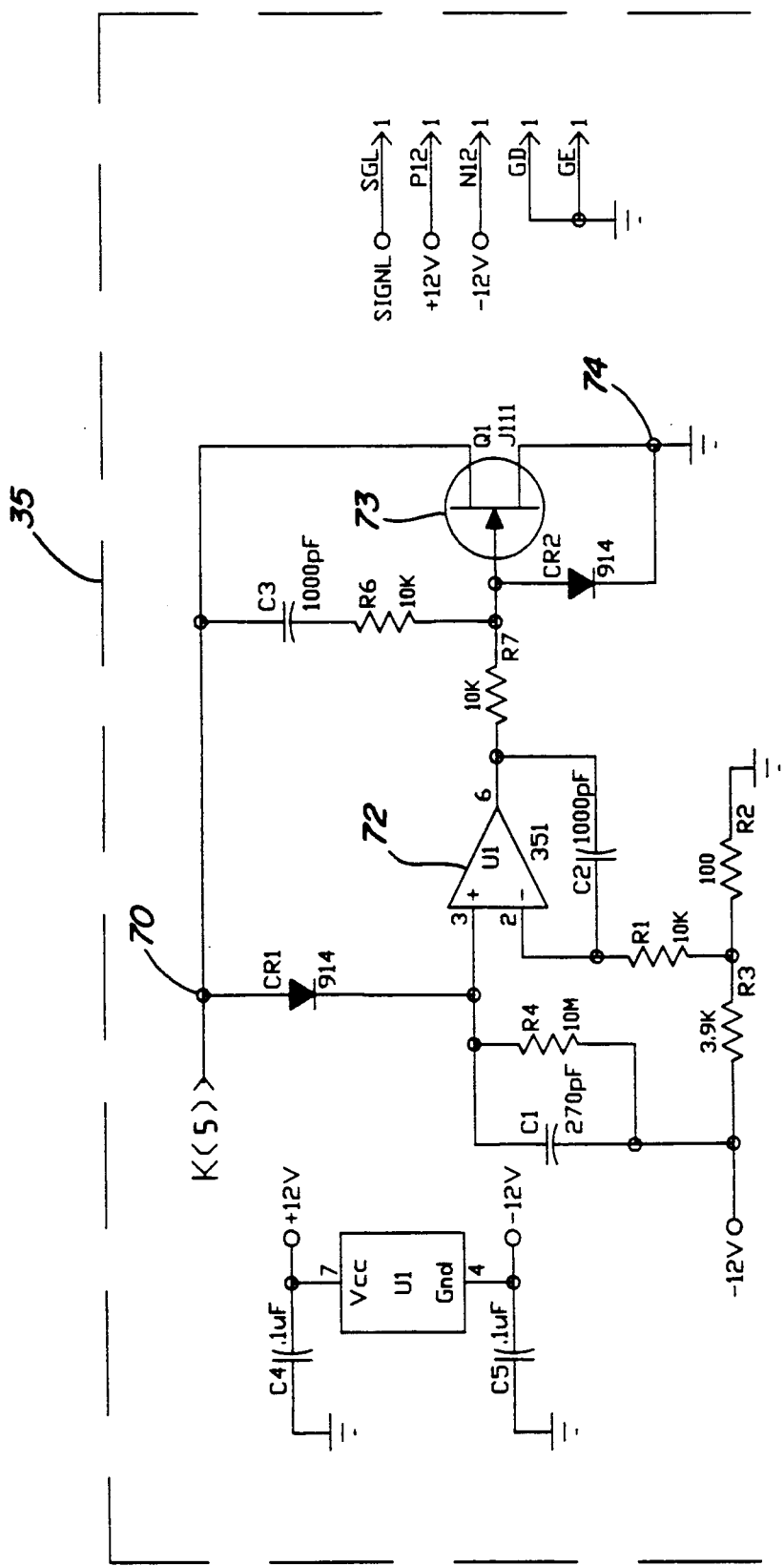
FIG. 6 is a schematic diagram showing an actual embodiment of the automatic level control module shown in FIG. 1.

As shown in FIG. 6, an automatic level control module 35 is connected at point 70. The 1.0 kilohm resistor coming from the second operational amplifier 67 to point 70 acts in conjunction with 73 used as variable resistor. The purpose of the module is to monitor the signal supplied to point 70, and if the signal exceeds 280 millivolts, third operational amplifier 72 would partially turn on second electronic attenuator 73 to act as a variable resistor, so that the signal coming out of the automatic level control module at point 74 is relatively constant prior to sending it to the frequency detector and carrier sense logic 36. Point 74 is connected through a resistor network into pin 9 of a Schmitt trigger 80, which is a Schmitt trigger inverter.

Figure 7:
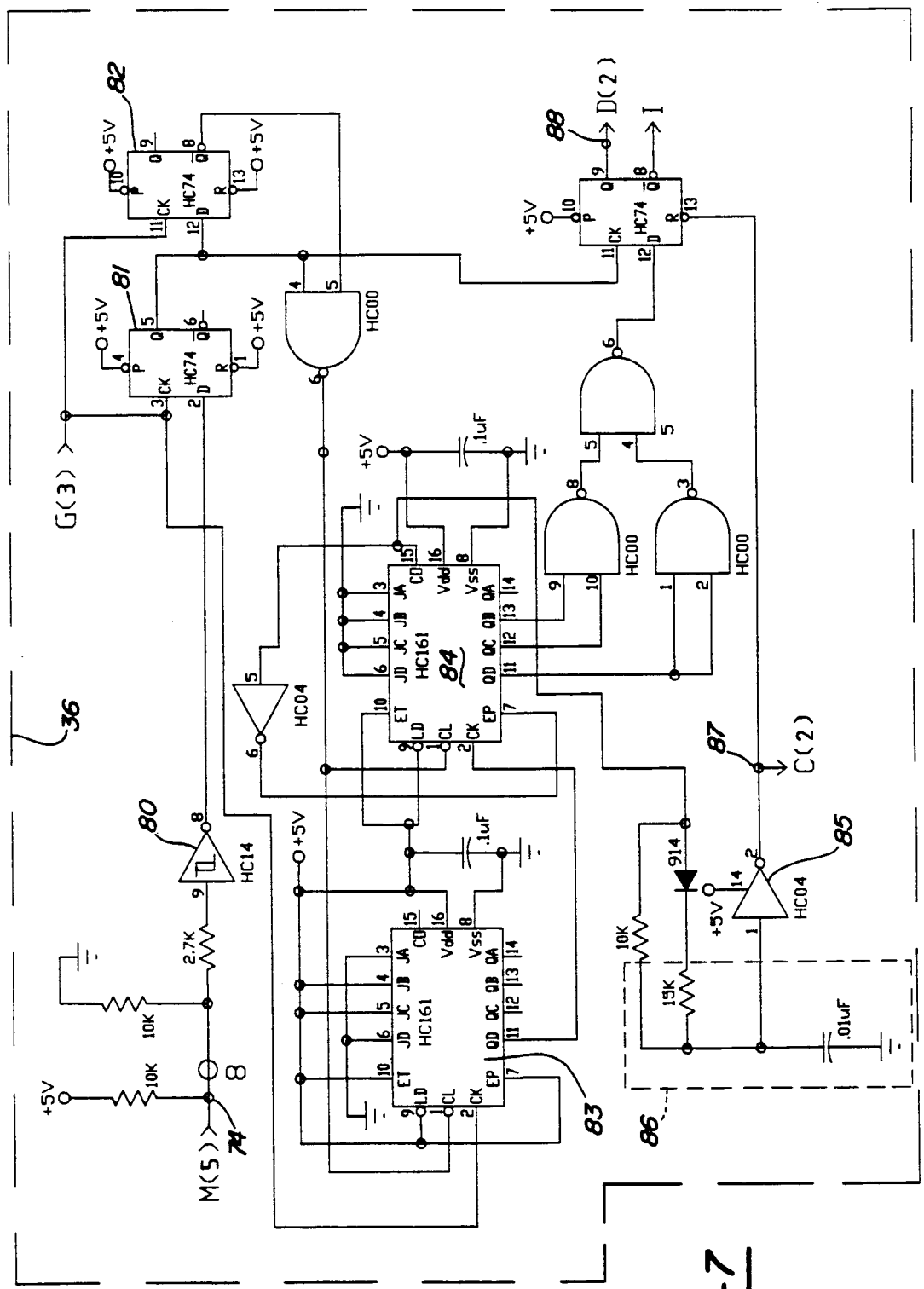
FIG. 7 is a schematic diagram showing an actual embodiment of the frequency detector and carrier sensor logic shown in FIG. 1.
Figure 8:
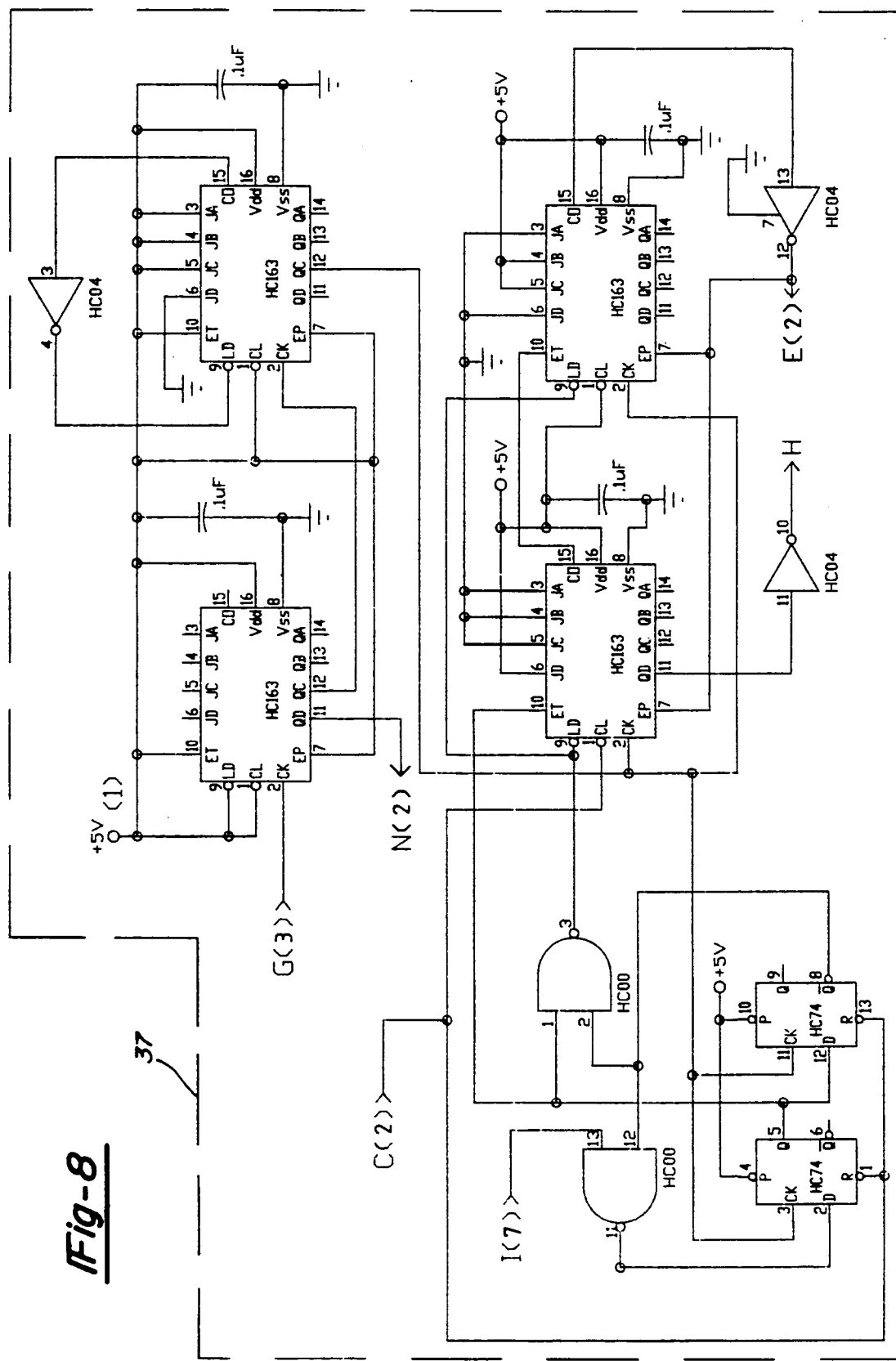
FIG. 8 is a schematic diagram showing an actual construction of the frequency source of Frequency Shift Key (FSK) portion of the transmit logic. It also includes the actual instruction of the address clock logic shown in FIG. 1.
Figure 9:
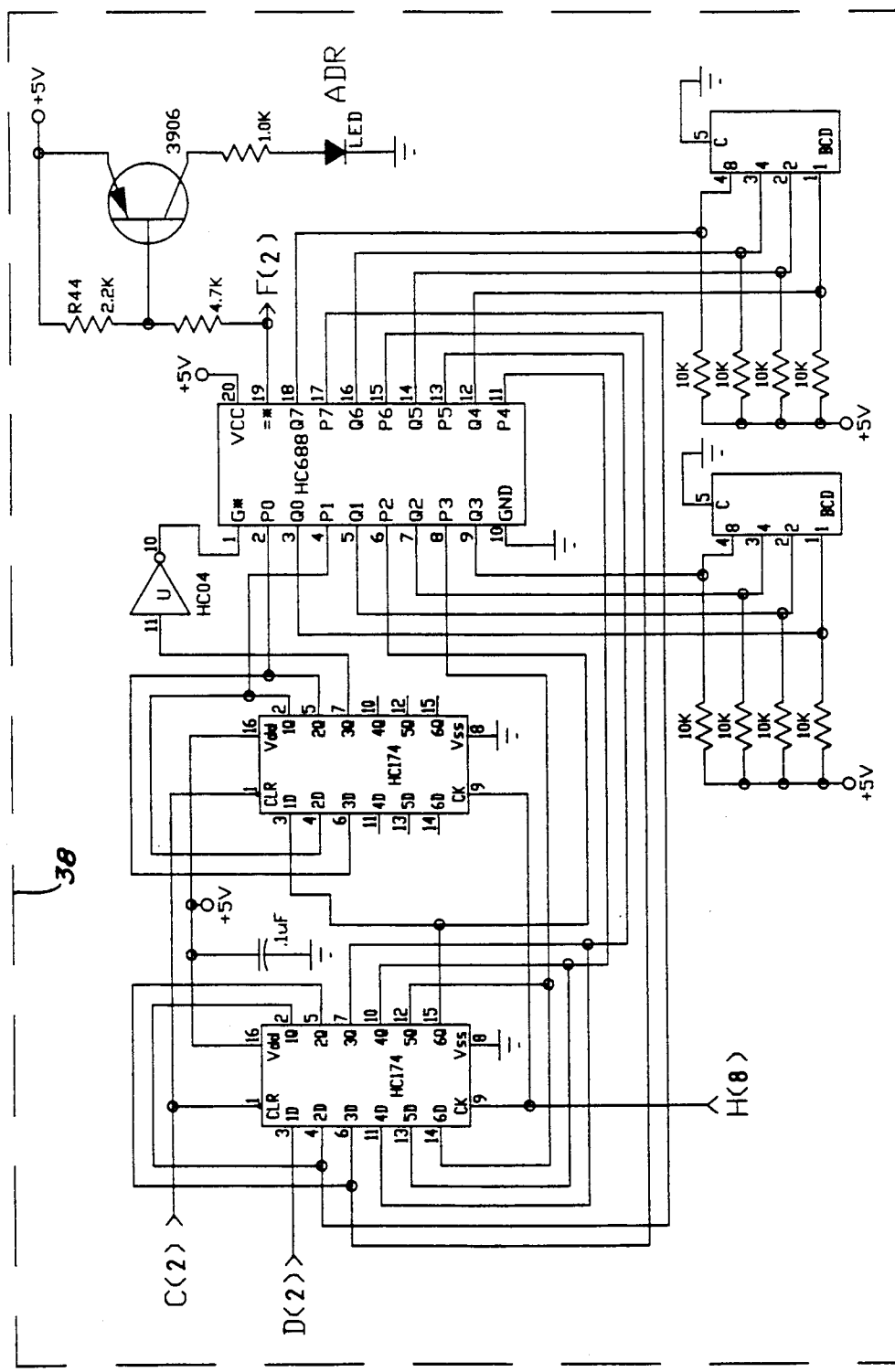
FIG. 9 is a schematic diagram showing an actual embodiment of the address decoder shown in FIG. 1.

Referring now to FIG. 7, the signal next goes into a first flip-flop 81 and a second flip-flop 82, the purpose of which is to extract the leading edge of the signal. This edge is used to trigger or to initialize a first counter 83 and a second counter 84 connected in series. The electrical wiring of this counter is set up such that there are 88 clock counts in between the presence of the edges of the receive signal when the carrier output is present. Keeping in mind that the receive signal is frequency modulated, and that the clock going into these pair of counters is running at 22.1184 Megahertz, the counters will count 80 if it is a high frequency signal, and it will count 96 if it is a low frequency signal. Therefore, presetting a threshold of 88 will allow this device then to say that the receive signal is either above or below the threshold, representing a high frequency or low frequency, which again represents what is a logic 0 or a logic 1.

In the case where there is no carrier in the line, the status of this device is such that the last time it saw an edge of the carrier, the counter started counting, and the counter overflow output (carrier output) came up, and as soon as the carry output comes up it locks up the second counter 84 through an inverter 85. By locking it up, it prevents further counting, and therefore the carrier output will remain always on until a new signal is received, in which case it will reset the counter to 00, which will also reset the carrier output to 0. If the carrier detect should drop to 0, meaning that there was a carrier being transmitted on the line, the time delay circuit 86, consisting of a 15 kilohm resistor and a 0.01 microfarad capacitor, delays the input to inverter 85, so that if the carrier detect does not persist more than 850 microseconds, then the output of inverter 85 will not go high, meaning that the carrier was not long enough to be considered a valid carrier, and therefore the signal present at point 87 is a logic signal representing the presence or the absence of a valid carrier.

It can be seen that there are 2 outputs that will be available. The first is at point 87, which is a presence or absence of a valid carrier, and the second is at point 88, which is the actual data itself, serial data that was received. Point 88 serial data is applied to 2 places, first, it is sent to an address decoder 38 (FIG. 9), which validates the data that is received by the frequency detector portion of 36. The address decoder 38 works in conjunction with the transmit register and address clock logic 37. This block 37, generates a correct frequency to decode the received information from the frequency detector to allow validation of the first byte. The address decoder has attached to it a pair of switches which are preset by the user to a certain address to identify the different units. If the first byte received by the frequency detector matches the switch settings, then an address valid logic signal will go through, which goes to the receiver logic block 39.

Block 39 allows the data that was received to pass through it and present itself to the RS232C interface if, and only if, the address valid signal is true, and the transmit enable signal from the transmit logic 27 is false. After the signal has passed through the receiver logic 39, it is supplied to the receiving computer.

Figure 10:
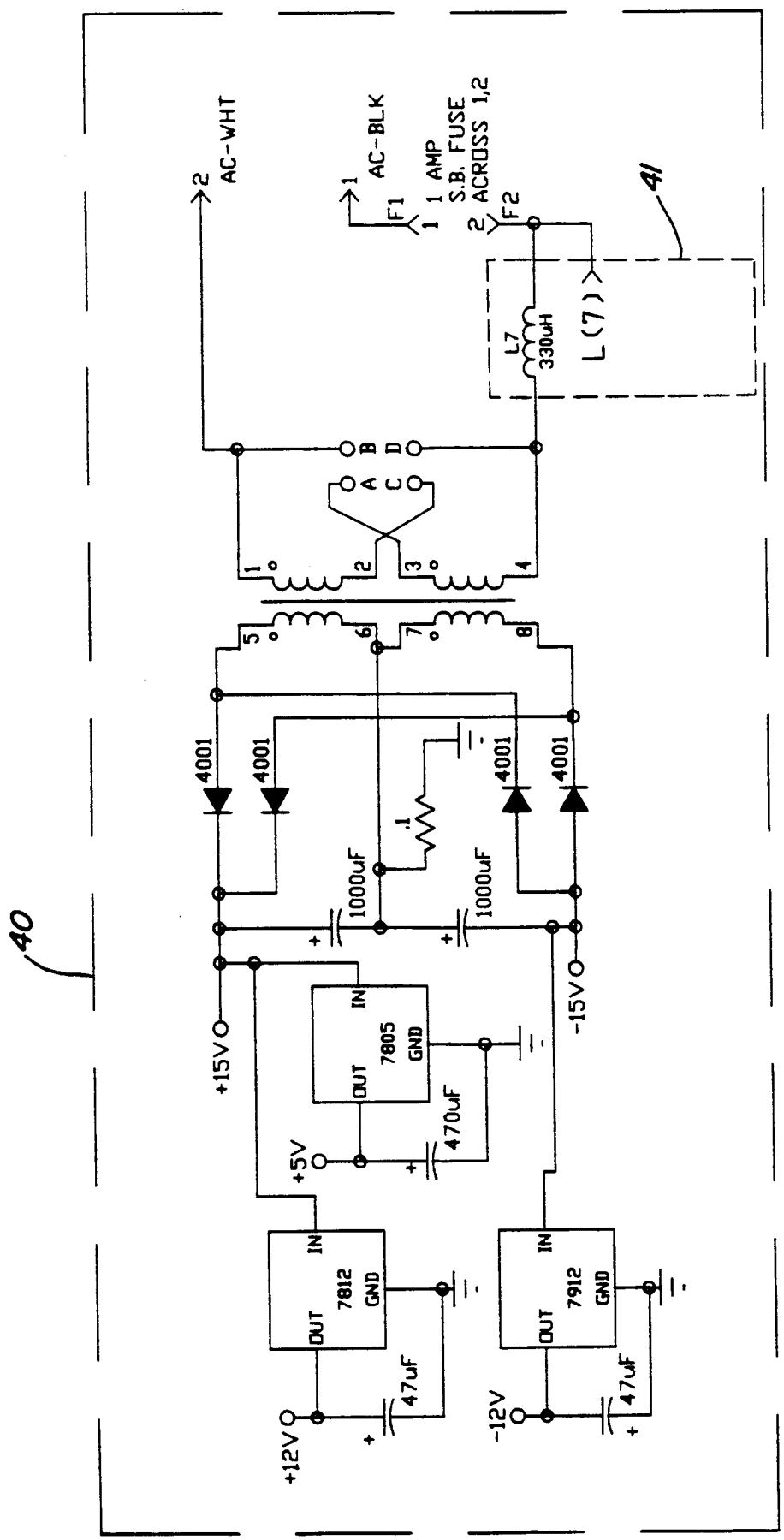
FIG. 10 is a schematic diagram showing an actual embodiment of the power supply and carrier isolator shown in FIG. 1.

As shown in FIG. 10, numeral 40 of the block diagram refers to the power supply. The power supply is essentially generic type circuitry, and provides a +15 V and −15 V unregulated output, and a +12 V and −12 V regulated output, which is used for the analog circuitry, and a +5 V output used by the logic. The reason for the incorporation of otherwise generic circuitry here is to show the importance of the carrier isolator 41, which is an inductor designed to present the power supply as high impedance to the carrier frequency of around 240 kilohertz. It provides a very high impedance path so as not to short circuit either the signal being transmitted, or any signal that is being received within that frequency band. The 330 microhenry conductance presents a low impedance path for the AC power of 50 to 60 Hz.

Thus, by analyzing the problems present in the prior art networking devices, and providing a device which operates on a very accurate frequency supplied by a crystal oscillator, and thus is an adjustment free device, and also has its transmitting portion isolated from the power line when it is not transmitting, and also has the provision in a power supply to prevent it from shorting out its own signal, a novel computer networking apparatus is provided.

I claim:

1. A computer networking apparatus including, in combination:
   (a) means to connect to a computer comprising an RJ45 interface;
   (b) means to accept data from a computer comprising an RS232C interface;
   (c) means to transmit said data over an AC power line including a transmit logic connected to said means to accept, a variable module counter connected to said transmit logic, a crystal oscillator connected to said variable module counter, a DC level signal conditioner connected to said variable module counter and said transmit logic, a low pass filter connected to said DC level signal conditioner, a transmit amplifier connected to said low pass filter and said transmit logic, and an interface circuit connected to said AC power line and said transmit amplifier;
   (d) means to receive data from an AC power line including an interface circuit connected to said AC power line, a band pass filter and limiting amplifier connected to said interface circuit, and an automatic level control module connected to said band pass filter and limiting amplifier;
   (e) means to process said data received including a Schmitt trigger connected to said to automatic gain control module, a frequency detector connected to said crystal oscillator and said Schmitt trigger, a carrier sense logic connected to said frequency detector, an address decoder connected to said frequency detector and said carrier sense logic, and a transmit register and address clock logic connected to said address decoder and said frequency detector;
   (f) means to decode said data received; and
   (g) means to transfer said decoded data to said computer.

2. The device claimed in claim 1, wherein the means to transfer said data to said computer includes:
   (a) a receive logic connected to said transmit register and address clock logic, said address decoder, and said frequency detector, said receive logic also being connected to said means to accept data.

3. The device claimed in claim 1, further including:
   (a) a power supply connected to said AC power line;
   (b) a carrier isolator interposed between said power supply and said AC power line.

4. A computer networking apparatus including, in combination:
   (a) means to connect to a computer;
   (b) means to accept data from a computer;
   (c) means to transmit said data over an AC power line including a transmit logic connected to said means to accept, a variable module counter connected to said transmit logic, a crystal oscillator connected to said variable module counter, a DC level signal conditioner connected to said variable module counter and said transmit logic, a low pass filter connected to said DC level signal conditioner, a transmit amplifier connected to said low pass filter and said transmit logic, and an interface circuit connected to said AC power line and said transmit amplifier;
   (d) means to receive data from an AC power line including an interface circuit connected to said AC power line, a band pass filter and limiting amplifier connected to said interface circuit, and an automatic level control module connected to said band pass filter and limiting amplifier;
   (e) means to process said data received including a Schmitt trigger connected to said to automatic gain control module, a frequency detector connected to said crystal oscillator and said Schmitt trigger, a carrier sense logic connected to said frequency detector, an address decoder connected to said frequency detector and said carrier sense logic, and a transmit register and address clock logic connected to said address decoder and said frequency detector;
   (f) means to decode said data received; and
   (g) means to transfer said decoded data to said computer.

5. The device claimed in claim 4, wherein the means to transfer said data to said computer includes:
   (a) a receive logic connected to said transmit register and address clock logic, said address decoder, and said frequency detector, said receive logic also being connected to said means to accept data.

6. The device claimed in 4 further including:
   (a) a power supply connected to said AC power line; and
   (b) a carrier isolator interposed between said power supply and said AC power line.

* * * * *